Patented May 18, 1926.

1,585,497

UNITED STATES PATENT OFFICE.

ALEXANDER JUST, OF BUDAPEST, HUNGARY, ASSIGNOR TO GENERAL ELECTRIC COMPANY, A CORPORATION OF NEW YORK.

PROCESS OF MANUFACTURING DUCTILE TUNGSTEN.

No Drawing. Application filed February 23, 1924. Serial No. 694,771.

The present invention relates to the preparation of metallic tungsten in the most advantageous physical condition for the production of ductile metal suitable for filaments for incandescent lamp or other purposes.

For the manufacture of ductile tungsten the trioxide of tungsten commonly is reduced by hydrogen and the resulting tungsten powder is pressed into rods which after sintering are swaged and drawn or otherwise worked to produce ductility. The physical condition of the tungsten powder has an important effect upon the qualities of the resulting metal. For example, very finely divided amorphous tungsten of a black color is less suitable than a more or less crystalline coarse-grained tungsten powder of a gray color.

Careful experiments have proved that the quality of the tungsten powder depends on the nature of the tungstic oxide, or other source from which it is derived.

It is the object of my invention to improve the workability of tungsten metal and also to improve the quality of the metal to resist the deteriorating influences of the high temperatures encountered in incandescent lamps.

In accordance with my invention the oxide of tungsten serving as derivation material for tungsten powder for the preparation of ductile metal is subjected to fusion preliminary to reduction to the metallic state. In accordance with one of the features of my invention the oxide of tungsten serving as derivation material is mixed with oxides of other metals, preferably alkaline earth or rare earth oxides.

My invention will be best understood from the following example. A solution of tungstic oxide $WO_3$ in ammonia is precipitated while heated substantially to the boiling point by hydrochloric acid, thereby producing a precipitate of pure tungstic trioxide which is filtered and dried at a temperature of about 120 to 150 degrees C. The dried product is shaped by pressing into the form of rods or other coherent form which is convenient for subsequent manipulation. The rods are heated in a suitable mold such as a tube of porcelain to red heat in contact with the air. The resulting rods of tungstic oxide are then fused by an oxyhydrogen blow pipe on a suitable support, for example a base of zircon or steatite. The melting process of course may be carried out by means other than an oxyhydrogen flame, as for example, by means of an electric arc between electrodes of tungsten, but in that case some of the material is lost by sublimation. The molten trioxide of tungsten after cooling forms tabular crystals.

The crystalline product thus produced is ground and reduced by hydrogen to the metallic state resulting in a finely crystallized tungsten body suitable for further treatment even if a comparatively low reducing temperature is employed, for example 800 to 900° C. The particles of sintered metal produced from prefused material appear to be placed nearer together than rods produced from a coarser powder and are very well suited for subsequent working. The process of converting the sintered rods to dense, ductile metal is the same as the process of rendering tungstic ductile as has been used heretofore.

In some cases, the derivation material, that is trioxide of tungsten, is mixed with suitable amounts of oxides of foreign metals which have been used heretofore as beneficial additions to metallic tungsten, particularly when the tungsten is to be converted into filaments for incandescent lamps. For example small amounts of chromium oxide or alkaline earth oxide or rare earth oxides or mixtures of such oxides may be added to the tungsten, for example thorium oxide or zirconium oxide. Preferably the purified and dried tungstic oxide is intimately mixed with 0.1 to 2.0 per cent of rare earth oxide, such as thorium oxide. With this end in view, the tungstic oxide may be impregnated in a well known way in a solution of nitrate of thorium or the like. After drying and heating the impregnated oxide, the nitrate is converted to an oxide.

Tungsten wires or other bodies to be used in incandescent lamps made by the above process are not only exceedingly ductile but the recrystallization which tends to take place after continued incandescence of the filaments in a lamp is retarded thereby causing the wires to remain ductile for a longer time and causing the lamps containing such wires to retain their original lighting efficiency for a longer time,

What I claim as new and desire to secure by Letters Patent of the United States, is:—

1. The step in the process of making metallic tungsten capable of being rendered ductile which consists in fusing the tungsten compound which serves as the derivation material for said tungsten.

2. The process of making metallic tungsten capable of being rendered ductile which consists in fusing trioxide of tungsten, reducing the product to the metallic state and ductilizing the same by mechanical working.

3. The process of making metallic tungsten capable of being rendered ductile which consists in fusing a trioxide of tungsten, mixing said trioxide with a foreign metallic oxide, and utilizing said fused mixture as a derivation material for metallic tungsten.

4. The process of making metallic tungsten capable of being rendered ductile which consists in shaping into coherent form an oxide of tungsten, fusing the product, and reducing the same to the metallic state.

5. The process of making metallic tungsten capable of being rendered ductile which consists in pressing trioxide of tungsten into rod-like form, heating said rods in contact with air to a red heat, and thereupon fusing the same by an oxyhydrogen blast.

6. The process of making metallic tungsten capable of being rendered ductile which consists in pressing trioxide of tungsten mixed with about 0.1 to 2.0 per cent of thorium dioxide into coherent form, baking in a mold at red heat, fusing the product, reducing the same and finally rendering the reduced material ductile by mechanical working.

In witness whereof, I have hereunto set my hand.

ALEXANDER JUST.